United States Patent [19]

Eagle

[11] 4,080,985
[45] Mar. 28, 1978

[54] WATER LEVEL ALARM APPARATUS

[76] Inventor: John Eagle, 147-16 10th Ave., Whitestone, N.Y. 11357

[21] Appl. No.: 696,871

[22] Filed: Jun. 17, 1976

[51] Int. Cl. .............................................. F16k 31/18
[52] U.S. Cl. ................................... 137/429; 137/386; 200/84 R; 340/245
[58] Field of Search .................. 137/386, 426, 429; 200/84 R X; 340/245 X; 73/319, 320, 321, 322, 322.5

[56] References Cited

U.S. PATENT DOCUMENTS

| 1,525,247 | 2/1925 | Leiss | 137/426 |
|---|---|---|---|
| 1,646,317 | 10/1927 | Rein | 73/322 |
| 2,663,772 | 12/1953 | Cochrane | 200/84 R |
| 2,780,692 | 2/1957 | Hinojosa | 200/84 R |
| 3,185,302 | 5/1965 | Kryzer | 137/426 |
| 3,849,771 | 11/1974 | Applin | 340/245 |
| 3,863,669 | 2/1975 | Ishida et al. | 137/386 |

FOREIGN PATENT DOCUMENTS

| 1,609,195 | 12/1969 | Germany | 340/245 |
|---|---|---|---|
| 264,327 | 4/1929 | Italy | 340/245 |

Primary Examiner—Martin P. Schwadron
Assistant Examiner—G. L. Walton
Attorney, Agent, or Firm—Robert D. Farkas

[57] ABSTRACT

This disclosure pertains to a float, slideably confined within a tube and buoyantly positioned therealong as determined by the level of the water confined within a container such as a bathtub, swimming pool or the like. The float, upon reaching an upper position, closes a set of stationary contacts, which in turn, completes a series electrical circuit including an alarm bell and battery. Simultaneously with the closing of the contacts, an electrically operated solenoid valve, disposed in series with a pipe communicating to a water source used to fill the container, closes so as to halt any further increase in the water level within the container. Altering the length of the float, or varying the positioning of the contacts relative to the mouth of the container, adjusts the maximum level of water that may be disposed within the container.

4 Claims, 1 Drawing Figure

4,080,985

WATER LEVEL ALARM APPARATUS

BACKGROUND OF THE INVENTION

1. Field of the Invention

This invention relates to water level alarm and control apparatus and more particularly to that class utilizing a float sensing element devoid of contact points affixed thereto.

2. Description of the Prior Art

The prior art abounds with portable water level electric alarm apparatus. U.S. Pat. No. 2,602,846 issued on July 8, 1952 to N. Polikoff teaches a battery operated float controlled alarm apparatus affixed to the interior surface of a bathtub in which the float portion utilizes a metallic strip affixed thereto, to close the contacts of a switch dependent upon the angular displacement of the pivotably secured float.

U.S. Pat. No. 2,907,994 issued on Oct. 6, 1959 to R. J. Harke discloses a cylindrical float slidingly retained within a tubular housing and having a contact strip affixed to the uppermost regions thereof, which when elevated, due to the buoyant characteristics of the float material, completes an electrical circuit, sounding an audible alarm.

U.S. Pat. No. 1,168,699 issued on Jan. 18, 1916 to A. Arbib pertains to a buoyant float utilizing a flexible string-like means to signal the level of water within a container to a normally open set of switch contacts, such that the switch contacts close upon the water level reaching a predetermined height within the container.

U.S. Pat. No. 1,421,717 issued on July 4, 1922 to A. Renda reveals a hollow float suspended from one end of a pivoted float supporting arm, the other end of which completing an electrical circuit and sounding an audible alarm when the float has been buoyantly elevated to a pre-determined height above the bottom of the container by the fluid contained therein.

All of the above mentioned Patents suffer the common deficiencies of requiring complex adjustments so as to alter the height level which the fluid may reach, within the container, before the audible alarm portions thereof are energized and further fail to adequately terminate the inflow of fluid, used to fill the container, upon the energization of the audible alarm.

SUMMARY OF THE INVENTION

A primary object of the present invention is to provide a control mechanism which terminates the flow of incoming fluids, used to fill a container, upon the level of the fluid, within the container, reaching a pre-determined height and concurrently sounding an audible alarm therewith.

Another object of the present invention is to provide an alarm and control apparatus whose float element may be modified as by cutting so as to effectively alter the maximum upper level that the fluid may achieve within the container.

Still another object of the present invention is to provide a control apparatus which operates from batteries thereby eliminating shock hazard.

Yet another object of the present invention is to provide an inexpensive control and alarm apparatus suitable for use with bathtubs.

Heretofore, water level alarm apparatus performed the unitary function of sounding an alarm when the water level achieved a desired pre-determined height. The present invention, not only performs this function, but provides for a means of automatically shutting down the incoming flow of a fluid to a container, thereby preventing the accidental overflow thereof in the event that the attendant does not manually shut off the flow of incoming water, thereby preventing an overflow. The present invention further provides for a simple adjustment of the maximum water level that may be achieved within the container by a permanent alteration in the buoyancy characteristics of the float portion thereof. Since the stationary contacts utilized are disposed a substantial distance away from the fluid, rusting is virtually eliminated thereby enhancing the reliability of the apparatus.

These objects, as well as other objects of the present invention, will become more readily apparent after reading the following description of the accompanying drawings.

DESCRIPTION OF THE PREFERRED EMBODIMENT

Figure 1:
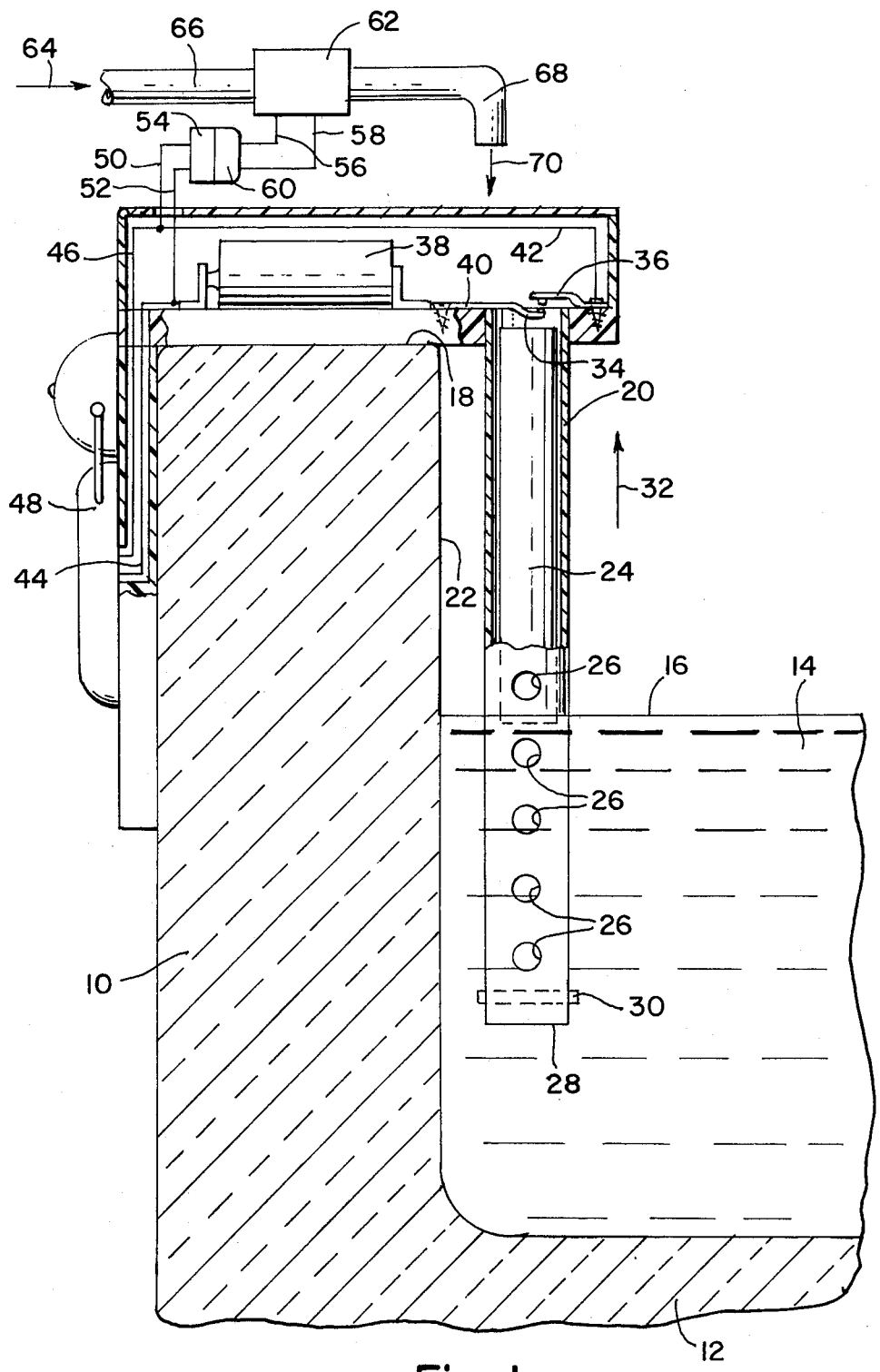
FIG. 1 is a side elevation, partial cross-sectional view of the present invention shown installed about one side wall of a container, such as a bathtub.

The structure and method of fabrication of the present invention is applicable to a series circuit comprising a set of normally open contacts and a battery. The output of the series circuit is connected to a bell or buzzer which is in turn connected to a normally open solenoid valve, by way of a plug and receptacle interposed in the electrical circuitry thereof.

The contacts are urged into a closed position when the uppermost surface of a cylindrical float, fabricated from a buoyant material such as styrofoam, a multi-cellular plastic material, comes into contact with one movable element thereof. The cylindrical float is slidingly engaged within a hollow tube having a plurality of openings along the length thereof. Fluid, entering the openings, causes the float to elevate its position as a function of the height of the uppermost surface of the fluid. Since the contacts are positioned at a fixed point relative to the mouth of the container, such as a bathtub, retaining the fluid, the water level required to close the contacts is determined by the length of the cylindrical float. Altering the length of the float varies the height that the water level may achieve before closing the contacts. Cutting the length of the float alters the maximum height of the water level before the contacts are closed and the alarm is sounded. If the normally open solenoid valve has its plug inserted in the receptacle, the solenoid portion of the valve is energized when the audible alarm sounds. At that time, the valve closes terminating any further flow of fluid tending to fill the container.

Now referring to the Figures, and more particularly to the embodiment illustrated in FIG. 1 showing the side wall of a bathtub 10 and an adjacent portion 12 of the floor thereof. Water 14 is shown extending above the floor of the tub and achieving a height at the uppermost surface 16 thereof somewhat lower than the uppermost rim 18 of the tub. Hollow cylindrical tube 20 extends downwardly into the water, running substantially parallel to the innermost surface 22 of side wall 10. Cylindrical float 24 is shown retained within tube 20 and is buoyantly supported by water 14 passing through holes 26 communicating to the interior of tube 20. Float 24 may be removed from an opening 28 disposed at the free end of tube 20 by the removal of rod 30.

When float 24 moves in the direction of arrow 32 a sufficient distance, lowermost stationary contact 34 is urged upwardly thereby so as to contact uppermost stationary contact element 36. Battery 38, upon the successful closure of contacts 34 and 36, provides energizing power by way of wires 40, 42, 44, and 46 to audible alarm bell 48. Simultaneously therewith, wires 50 and 52 leading to receptacle 54 provide energizing power to wires 56 and 58, by way of plug 60, electrically connected to receptacle 54. Solenoid valve 62, of the normally open variety, is then energized shutting off the flow of water, flowing in the direction of arrow 64 into pipe 66 from communicating with pipe 68 and thence, in the direction of arrow 70, into the tub. Disconnecting plug 60 from receptacle 54 permits the apparatus to be utilized as an alarm without the fluid control feature and to be transported from container to container where electrical connections can be made to resident control valves, if desired.

One of the advantages of the present invention is a control mechanism which terminates the flow of incoming fluids used to fill a container, upon the level of the fluid, within the container, reaching a pre-determined height and concurrently sounding an audible alarm therewith.

Another advantage of the present invention is an alarm and control apparatus whose float element may be modified as by cutting so as to effectively alter the maximum upper level that the fluid may achieve within the container.

Still another advantage of the present invention is a control apparatus which operates from batteries thereby eliminating shock hazard.

Yet another advantage of the present invention is an inexpensive control and alarm apparatus suitable for use with bathtubs.

Thus, there is disclosed in the above description and in the drawings, an embodiment of the invention which fully and effectively accomplishes the objects thereof. However, it will become apparent to those skilled in the art, how to make variations and modifications to the instant invention. Therefore, this invention is to be limited, not by the specific disclosure herein, but only by the appending claims.

The embodiment of the invention in which an exclusive privilege or property is claimed are defined as follows:

I claim:

1. A water level alarm and control apparatus comprising a float, a pair of stationary normally open contacts, said float urging said pair of normally open contacts into a closed circuited condition upon said float being buoyantly elevated by a fluid within a container, means to audibly signal said closed circuited condition, a power supply, said power supply providing energizing power for said audible signalling means, means to control the ingress of said fluid into said container, said control means terminating said ingress of said fluid into said container upon said closed circuited condition, means to disengageably connect said control means to a series circuit including said power supply and said pair of normally open contacts, said float comprises a multi-cellular plastic material possessing buoyant characteristics, a hollow tube, said tube having a passageway the longitudinal axis of said passageway being disposed along a vertical line, the upper end of said passageway being disposed beneath said pair of normally open contacts, said float having a cylindrical shape and being slideably disposed within said passageway, a plurality of holes within the walls of said hollow tube communicating with said passageway, a rod, said rod being removably affixed to said walls adjacent the other end of said hollow tube and traversing said passageway therein.

2. The water level alarm and control apparatus as claimed in claim 1 wherein said control means comprises a normally open electrically operated solenoid valve, said solenoid valve being disposed intermediate a source of said fluid and a pipe communicating said fluid into said container.

3. The water level alarm and control apparatus as claimed in claim 2 wherein said connecting means comprises a plug electrically connected to said solenoid valve, a receptacle electrically connected to said series circuit.

4. The water level alarm and control apparatus as claimed in claim 1 wherein said power supply comprises a battery.

* * * * *